Patented July 13, 1954

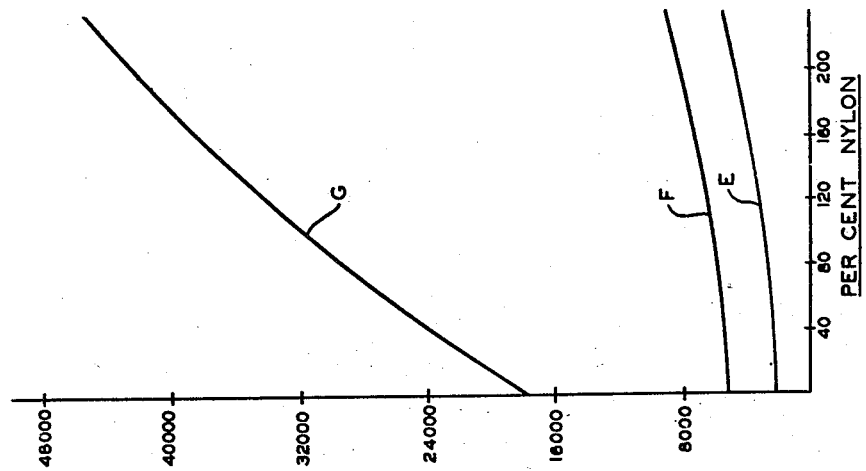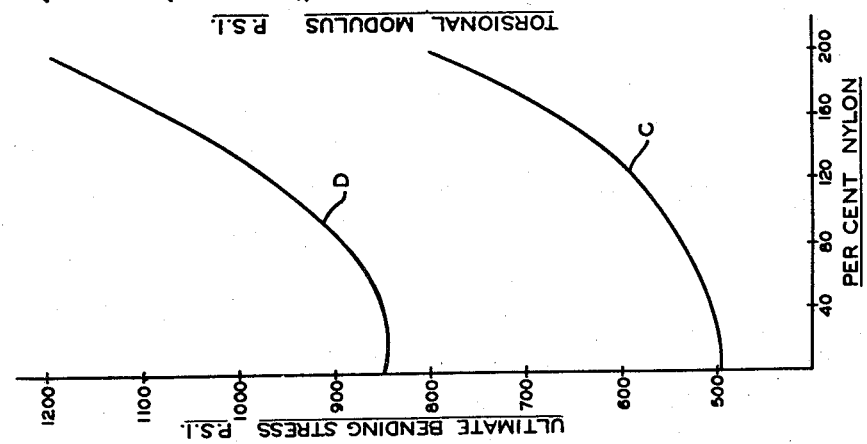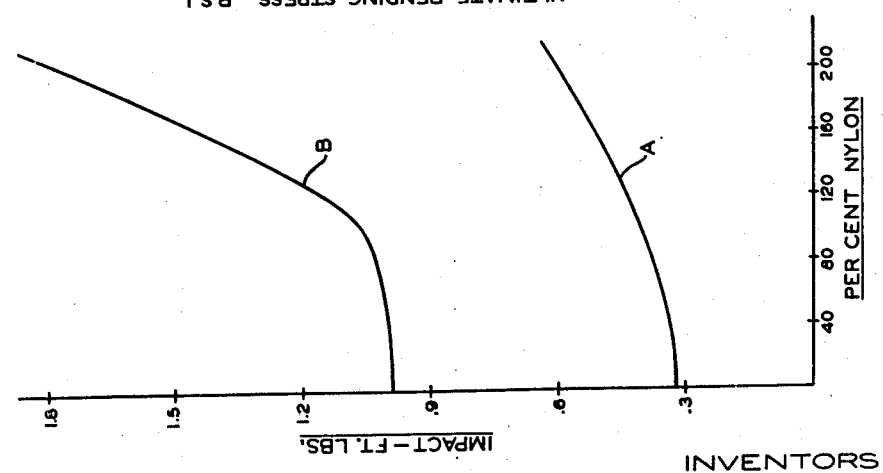

2,683,697

UNITED STATES PATENT OFFICE 2,683,697

NYLON-REINFORCED COPOLYMER RESINS

Isaac L. Newell, Wethersfield, and John K. Atticks, East Hartford, Conn., assignors to United Aircraft Corporation, East Hartford, Conn., a corporation of Delaware Application January 27, 1951, Serial No. 208,226

3 Claims. (Cl. 260—2.5)

This invention relates to a thermosetting plastic composition having improved physical properties, particularly those properties responsible for strength, toughness and abrasive resistance.

Butadiene-acrylonitrile-phenolic copolymer resins have been successfully used to make molded articles, both of the solid plastic and of the expanded plastic, but for certain uses in the aircraft industry, particularly for the reinforcement of airfoil sections, such as hollow steel propeller blades, the strength and toughness is not sufficient. Also, the erosion resistance of the butadiene-acrylonitrile-phenolic copolymer resins is lower than desired for use on the external surfaces of airfoils.

We have found that the addition of polyamide fiber, known as nylon, to butadiene-acrylonitrile-phenolic copolymer resins will, when properly treated, produce a material having superior physical properties.

The polyamide fibers used in solid molded articles may vary widely as to diameter, length and amount used. Where the geometry of the part is complex and particularly where there are thin sections, a small diameter fiber, preferably about 0.02 mm., or as small as 0.01 mm. and with a length of 0.01 to 10.0 mm. and preferably not less than five times its diameter, can be used, but where the part is in the form of a regular solid such as a bar, slab, etc., the diameter may be as great as 1.0 mm. with a length equal to or greater than the longest dimension of the part. Where the nylon modified butadiene-acrylonitrile-phenolic copolymer resin is to be expanded into a foam by means of a blowing agent, the fibers should be as small diameter as practical, especially if the foam is to be of low density, i. e., 10 to 15 lbs. per cubic foot.

The inclusion of the short organic fibers containing active amino groups in the resin at the time of blowing markedly improves the resistance to friability, compressive strength, flexural strength, tensile strength, toughness and temperature resistance of the resulting expanded plastic, as well as makes the cell structure more uniform and of finer size. As the blowing reaction proceeds, the fibers not only physically reinforce the cell walls of the expanded structure, but are also mutually soluble with or chemically linked to the resin structure during the reaction.

The term "nylon" as used herein means a synthetic polymer having long chain linear polycarbonamide groups separated by hydrocarbon chains and which is capable of being formed into a filament in which the structural elements are oriented in the direction of the axis. Thus, the term "nylon" refers to an entire family of polyamide resins which are generally of the reaction of polybasic acids and polyfunctional amines carried out in such a way that predominantly linear polymers are formed. The resins vary according to (1) the type of dibasic acid used, (2) the type of diamine used, (3) the proportion of ingredients in the reaction and (4) the method and the extent of polymerization. Moreover, two or more nylon polymers may be blended to give compositions different from the parent nylons. Thus, an almost unlimited number of nylons is possible, each with its characteristic physical properties.

One of the many nylon fibers suitable for use in connection with the present invention is the 6—6 nylon which contains an amide group for every six carbon atoms having a free hydrogen, and is formed from hexamethylene diamine and adipic acid.

The amount of nylon to be used in conjunction with butadiene-acrylonitrile-phenolic copolymer resin will depend on the physical properties desired. Table 1 shows the effect of various percentages of nylon, based on the amount of butadiene-acrylonitrile elastomer present, on some of the physical properties. From 10% to 1000% may be used, depending on the desired characteristics. The addition of the nylon fibers to the copolymer mass increases the impact resistance of the product, greatly increases its ultimate bending strength and, particularly with the resins of higher density, greatly increases the torsional modulus, the desirable improvement in the physical properties being more pronounced with the higher concentration of the nylon fibers.

Table 2 shows the inferior effect of similarly sized fibers of viscose rayon on the physical properties of the composition. It is believed that the small but significant solubility or reactivity of the nylon in the phenolic during the processing cycle produces an exceedingly strong bond between the nylon fibers and the plastic which enhances the physical properties of the butadiene-acrylonitrile-phenolic copolymer resin. Microscopic examination of fractured specimens of expanded butadiene-acrylonitrile-phenolic copolymer resin reacted in the presence of nylon fibers and in accordance with the present invention, show that the nylon fibers are bonded to the foam and break with it while similar expanded resinous masses incorporating rayon fibers in place of the nylon fibers show lack of bonding between the resinous mass and the rayon fibers, and in such cases the rayon fibers pull out of the foam at the point of fracture.

The following examples of solid (unexpanded) and expanded nylon butadiene-acrylonitrile-phenolic copolymer resins and their methods of processing are intended to be illustrative and exemplary of the widely varying, preferred compositions and methods forming part of this invention, but are not intended to be restrictive in any sense, as many variations are possible, as will be obvious to one skilled in the art.

EXAMPLE 1.—SOLID NYLON BUTADIENE-ACRYLONITRILE-PHENOLIC COPOLYMER RESINS

|  | Parts |
|---|---|
| Butadiene-acrylonitrile rubber | 100 |
| Solid phenolic resin ("Durez" 12686) | 75 |
| Liquid phenolic resin ("Durez" 13037) | 60 |
| Nylon flock  0.5 mm. diam | 200 |
| Hexamethylenetetramine | 11 |

The solid and liquid phenolic resins contain some unreacted phenol and are proportioned so that the total mass has desirable milling properties on the mill to be used, and to provide the desired final physical properties. The rubber is broken down on a mill and banded. The barium sulfate and nylon fibers are then added and milled. The solid phenolic resin is next added, followed by the liquid resin and hexamethylenetetramine. The milling is continued until a good dispersion of all ingredients is obtained. The cure is ½ hour at 270° F. followed by 1 hour at 350° F. This cured material has superior physical properties, especially impact resistance.

EXAMPLE 2

Similar solid copolymer resins reinforced with nylon fibers may be made by substituting from 50 parts to 500 parts of one or more phenolic resins for the 135 parts specified in Example 1, and by using from 10 to 1000 parts of nylon fibers or flock for 100 parts of the rubber. For wear resistance, we prefer a range of 100 to 750 parts of nylon flock or fibers to each 100 parts of the butadiene-acrylonitrile rubber, while for resistance to high velocity erosion we prefer a range of 50 to 200 parts of the nylon fibers to 100 parts of the rubber.

EXAMPLE 3.—EXPANDED NYLON BUTADIENE-ACRYLONITRILE-PHENOLIC COPOLYMER RESIN (LOW DENSITY)

|  | Parts |
|---|---|
| Butadiene-acrylonitrile rubber | 100 |
| Solid phenolic resin ("Durez" 12686) | 75 |
| Liquid phenolic resin ("Durez" 13037) | 60 |
| Barium sulfate | 30 |
| Nylon flock  0.5 mm. diam | 30 |
| Hexamethylenetetramine | 11 |
| Azo-bis-isobutyronitrile | 10 |

The mixing is accomplished as in Example 1 with the azo-bis-isobutyronitrile added after the addition of the hexamethylenetetramine. After curing for 45 minutes at 240° F., followed by 1 hour at 350° F., a cellular structure is formed having a density of 10–12 lbs. per cubic foot with excellent physical properties.

EXAMPLE 4

Within the limits given in Example 2, variations may be made in the quantity of mixed phenolic resin used in Example 3 and a wide variety of conventional or desired rubber-blowing agents may be substituted for the azo-bis-isobutyronitrile in that example. Among such blowing agents are "Unicel" (diazoaminobenzene), "Unicel ND," the alkyl ammonium nitrites, such as diisopropyl ammonium nitrite, diisobutyl ammonium nitrite, dicyclohexyl ammonium nitrite and sodium bicarbonate. The amount of blowing agent used may be widely varied dependent on the properties desired, but will ordinarily be from 1% to 10% of the weight of the other ingredients employed. Other fillers and pigments than barium sulfate may also be used, such as calcium carbonate, titanium dioxide or the like in suitable amounts, where desired.

Also, the quantity of the nylon flock may be varied using from 10 to 200 parts for each 100 parts of butadiene-acrylonitrile rubber as given in Example 3 or with modifications thereof as specified immediately above. The size of the nylon fibers or flock may also be varied, as set forth above, and may consist of a random or selected distribution of sizes. Where the expanded nylon butadiene-acrylonitrile-phenolic copolymer resin is to be used as the filling of a hollow-steel propeller blade, the quantity of nylon flock is preferably from 30 to 140 parts, and most preferably about 70 parts for each 100 parts of butadiene-acrylonitrile rubber as given in Example 3.

EXAMPLE 5. — EXPANDED NYLON BUTADIENE - ACRYLONITRILE - PHENOLIC COPOLYMER RESINS (MEDIUM DENSITY)

|  | Parts |
|---|---|
| Butadiene-acrylonitrile rubber | 100 |
| Solid phenolic resin ("Durez" 12686) | 75 |
| Liquid phenolic resin ("Durez" 13037) | 60 |
| Barium sulfate | 30 |
| Nylon flock | 70 |
| Hexamethylenetetramine | 11 |
| Azo-bis-isobutyronitrile | 5 |

These materials are mixed as in Example 3 and cured 1 hour at 270° F. followed by 4 hours at 350° F. A sponge having a density of 25–30 lbs. per cubic foot with excellent physical properties is obtained.

A wide variety of solid and liquid phenolic resins may be used in the foregoing examples, such as "Bakelite" BR0014 liquid phenolic-formaldehyde resin, and "Durez" 12686 and "Durez" 13037, and the liquid and solid novolaks. Thus, phenolic resins which cannot be cured to insolubility or infusibility may be used as well as those which can be cured to insolubility and infusibility.

"Bakelite" BR0014 is a liquid phenolic resin made from equimolal quantities of phenol and formaldehyde, containing a small amount of water, usually about 3%, and some unreacted phenol, usually 10 to 20%, which can be heat-hardened to infusibility by heating for 30 to 50 minutes at about 121° C. Such resin may be prepared according to the process disclosed by Baekeland, United States Patent No. 942,808.

"Durez" 12686 and "Durez" 13037 are phenolic resins produced by reaction of a phenol with cashew nut shell oil and which may be reacted to infusibility with hexamethylenetetramine, its equivalent or with aldehydes. Such resins are disclosed in the United States patents to Shepard, Bolney and Sontag No. 2,203,206, June 4, 1940, and in combination with various butadiene acrylonitrile rubbers in the patent to Shepard and Bolney No. 2,532,374, December 5, 1950. "Durez" 12687 is similar to "Durez" 12686 except that it incorporates a small proportion of hexamethylenetetramine.

Other examples of expanded nylon butadiene-acrylonitrile-phenolic copolymer resinous materials in accordance with the present invention are shown by the following examples and illustrate the wide range of nylon percentages which may be incorporated in the resinous masses:

EXAMPLE 7

| | |
|---|---:|
| "HyCar OR-15" (Butadiene-acrylonitrile-rubber) | 100 |
| Nylon flock | 200 |
| "Durez" 12686 | 75 |
| "Durez" 13037 | 60 |
| Hexamethylenetetramine | 11 |
| Azodiisobutyronitrile | 10 |

EXAMPLE 8

| | |
|---|---:|
| "HyCar OR-15" | 100 |
| Nylon flock | 10 |
| "Durez" 12686 | 75 |
| "Durez" 13037 | 60 |
| Hexamethylenetetramine | 11 |
| Azodiisobutyronitrile | 10 |

EXAMPLE 9

| | |
|---|---:|
| "HyCar OR-15" | 100 |
| Nylon flock | 70 |
| Solid and liquid phenolic-aldehyde resins | 135 |
| Diazoaminobenzene | 10 |

EXAMPLE 10

| | |
|---|---:|
| "HyCar OR-15" | 100 |
| BaSO₄ | 30 |
| Nylon flock | 70 |
| "Durez" 12686 | 75 |
| "Bakelite" BR0014 | 60 |
| Hexamethylenetetramine | 11 |
| Azodiisobutyronitrile | 10 |

EXAMPLE 11

| | |
|---|---:|
| "HyCar OR-15" | 100 |
| Nylon | 50 |
| "Durez" 12687 | 150 |
| "Bakelite" BR0014 | 100 |
| Hexamethylenetetramine | 6 |
| Lignin | 40 |
| Zinc oxide | 10 |
| Polyethyleneditriricinoleate | 5 |
| Glycerolmonoricinoleate | 5 |
| Stearic acid | 5 |
| Sodium bicarbonate ("Unicel S") | 30 |
| BaSO₄ | 30 |

The resin of Example 11 exhibited the following properties:
Density _____ 15.6 to 14.15 pounds per cu. ft.
Bending modulus _____ 17,700 to 22,800
Ultimate bending stress _____ 270 to 339
Deflection 0.012" ____ 90 minutes at 225° F.

EXAMPLE 12

| | |
|---|---:|
| "HyCar OR-15" | 100 |
| Nylon | 10 |
| "Durez" 12687 | 150 |
| "Bakelite" BR0014 | 100 |
| Azodiisobutyronitrile | 15 |
| Lignin | 40 |
| Zinc oxide | 10 |
| Polyethyleneditriricinoleate | 5 |
| Gylcerolmonoricinoleate | 5 |
| Stearic acid | 5 |

EXAMPLE 13

| | |
|---|---:|
| "HyCar OR-15" | 100 |
| Nylon | 25 |
| "Durez" 12687 | 120 |
| "Bakelite" BR0014 | 80 |
| Azodiisobutyronitrile | 15 |
| Lignin | 40 |
| Zinc oxide | 10 |
| Polyethyleneditriricinoleate | 5 |
| Glycerolmonoricinoleate | 5 |
| Stearic acid | 5 |

Other examples of dense, unexpanded nylon butadiene-acrylonitrile-phenolic copolymer resinous materials in accordance with the present invention are shown by the following examples and illustrate the wide range of nylon percentages which may be incorporated in the resinous masses.

EXAMPLE 14

| | |
|---|---:|
| "HyCar OR-15" | 100 |
| Nylon | 100 |
| Solid and liquid phenolic formaldehyde resins | 50 |

EXAMPLE 15

| | |
|---|---:|
| "HyCar OR-15" | 100 |
| Nylon | 100 |
| Novolak (liquid and solid phenolic resins) | 50 |

EXAMPLE 16

| | |
|---|---:|
| "HyCar OR-15" | 100 |
| Nylon | 100 |
| Novolak (liquid and solid phenolic resins) | 200 |

EXAMPLE 17

| | |
|---|---:|
| "HyCar OR-15" | 100 |
| Nylon | 100 |
| Novolak (liquid and solid phenolic resins) | 500 |

EXAMPLE 18

| | |
|---|---:|
| "HyCar OR-15" | 100 |
| Nylon | 200 |
| "Durez" 12686 and 13037 | 50 |

EXAMPLE 19

| | |
|---|---:|
| "HyCar OR-15" | 100 |
| Nylon | 200 |
| "Durez" 12686 and 13037 | 500 |

EXAMPLE 20

| | |
|---|---:|
| "HyCar OR-15" | 100 |
| Nylon | 750 |
| "Durez" 12686 and 13037 | 135 |
| Hexamethylenetetramine | 11 |

EXAMPLE 21

| | |
|---|---:|
| "HyCar OR-15" | 100 |
| Nylon | 1000 |
| "Durez" 12686 and 13037 | 135 |
| Hexamethylenetetramine | 11 |

Table 1 shows certain properties of the nylon butadiene-acrylonitrile-phenolic copolymer resinous plastics prepared in accordance with Examples 5 and 1 above, respectively, but with variations in the quantity of nylon.

*Table 1*

FOAM 25 LBS. PER CUBIC FOOT

| Nylon (Percent of rubber) | Ultimate Bending Strength | Bending Modulus | Impact (½" x 1" unnotched) |
|---|---|---|---|
| | *P.s.i.* | *P.s.i.* | *Ft.-lbs.* |
| 0 | 414 | 4,540 | 0.997 |
| 100 | 457 | 4,630 | 1.0761 |
| 200 | 660 | 5,980 | 1.8846 |

Table 1—Continued
SOLID 70 LBS. PER CUBIC FOOT

|     |       |        | (½" x ½" notched) |
| --- | ----- | ------ | ----------------- |
| 0   | 2,890 | 17,550 | .569              |
| 70  | 4,540 | 32,200 | .625              |
| 200 |       | 39,800 | 1.031             |

In the accompanying drawings there are shown various curves which give the properties with respect to various resinous copolymer masses in accordance with the present invention. In Figure 1 is shown the effect of increasing percentages of nylon fibers on the impact values of expanded nylon butadiene-acrylonitrile-phenolic copolymer resins plastics. In this figure the curve "A" represents values obtained by measurements on an expanded copolymer sponge substantially in accordance with Example 3 and having a density of approximately 15 lbs. per cubic foot, the abscissas representing varying percentages of nylon staple fibers as measured on a uniform quantity of butadiene-acrylonitrile rubber, while the ordinates show the impact value of a ½" x ½" notched specimen. The curve "B" represents similar values with respect to a specimen having a density of approximately 25 lbs. per cubic foot.

Figure 2 shows the increase in ultimate bending strength with increasing percentages of nylon flock or fibers, and in this figure the abscissas similarly represent the percentage of nylon based upon a fixed quantity of the butadiene-acrylonitrile rubber while the ordinates show the values for the ultimate bending stress in pounds per square inch. Curve "C" shows the values obtained with a resinous mass in accordance with the present invention having a density of 24 lbs. per cubic foot, while curve "D" shows the values obtained with a specimen having a density of 30 lbs. per cubic foot.

Figure 3 is a set of curves plotted to show variation in torsional modulus expressed in pounds per square inch against the various percentages of nylon added to the rubber and forming the resinous copolymer mass. In Figure 3 curve "E" shows the values obtained with a mass having a density of 24 lbs. per cubic foot, curve "F" shows the values obtained with a mass having a density of 30 lbs. per cubic foot, while curve "G" shows the greatly increased values on an unexpanded resinous mass having a density of 70 lbs. per cubic foot.

Table 2 shows comparative properties in copolymer resins of a similar kind in which an equal amount of viscose rayon was substituted for the nylon.

Table 2

|                                | Nylon, Modified | Rayon, Modified |
| ------------------------------ | --------------- | --------------- |
| Density (lbs. per cu. ft.)     | 31.7            | 34.17           |
| Flexural Modulus (p. s. i.)    | 22,500          | 18,550          |
| Ultimate Bending Stress (p. s. i.) | 1,025       | 672             |
| Torsional Modulus (p. s. i.)   | 12,150          | 10,650          |
| Ultimate Stress—Torsion (p. s. i.) | 799         | 547             |

In the foaming of nylon butadiene-acrylonitrile-phenolic copolymer resins plastics, the nylon appears to have an additional effect on the foaming action. The gases formed are more easily diffused or carried from one part of the foam to another, thus equalizing the pressure distribution and preventing rupture of the cell walls due to excessive pressure.

The invention in its broader aspects is not limited to the specific process, steps and compositions shown and described but departures may be made therefrom within the scope of the accompanying claims without departing from the principles of the invention and without sacrificing its chief advantages.

What is claimed is:

1. A composition of matter comprising the expanded reaction product of butadiene-acrylonitrile copolymer rubber 100 parts with phenolic-formaldehyde resin 50 to 500 parts and fibers of a synthetic polymer having long chain linear polycarbonamide groups separated by hydrocarbon chains 30 to 140 parts embedded and uniformly distributed in an unoriented condition in said reaction product.

2. A composition of matter comprising the expanded reaction product of butadiene-acrylonitrile copolymer rubber 100 parts with phenolic-formaldehyde resin 50 to 500 parts and fibers of a synthetic polymer having long chain linear polycarbonamide groups separated by hydrocarbon chains about 70 parts embedded and uniformly distributed in an unoriented condition in said reaction product.

3. A process of forming a reinforced resin which comprises mixing 50 to 500 parts of phenolic-formaldehyde resin with 100 parts of a butadiene-acrylonitrile copolymer rubber, embedding fibers of a synthetic polymer having long chain linear polycarbonamide groups separated by hydrocarbon chains in said mixture by distributing said fibers throughout the mixture in an unoriented condition and subjecting the mixture and fibers to heat to cure the resin.

4. A process of forming a reinforced resin which comprises mixing 50 to 500 parts of phenolic-formaldehyde resin and 10 to 1000 parts of fibers of a synthetic polymer having long chain linear polycarbonamide groups separated by hydrocarbon chains with 100 parts of a butadiene-acrylonitrile copolymer rubber, the fibers being distributed uniformly throughout the resin in an unoriented condition and subjecting the mixture to heat to cure the resin.

5. A process of forming a reinforced resin which comprises mixing 50 to 500 parts of phenolic-formaldehyde resin and 50 to 200 parts of fibers of a synthetic polymer having long chain linear polycarbonamide groups separated by hydrocarbon chains with 100 parts of butadiene-acrylonitrile copolymer rubber, the fibers being distributed uniformly throughout the resin in an unoriented condition and subjecting the mixture to heat to cure the resin.

6. A process of forming a solid reinforced resin which comprises mixing 50 to 500 parts of phenolic-formaldehyde resin and 100 to 750 parts of fibers of a synthetic polymer having long chain linear polycarbonamide groups separated by hydrocarbon chains with 100 parts of a butadiene-acrylonitrile copolymer rubber, the fibers being distributed uniformly throughout the resin in an unoriented condition and subjecting the mixture to heat to cure the resin.

7. A process of forming an expanded reinforced resin which comprises mixing 50 to 500 parts of phenolic-formaldehyde resin and 30 to 140 parts of fibers of a synthetic polymer having long chain linear polycarbonamide groups separated by hydrocarbon chains with 100 parts of a butadiene-acrylonitrile copolymer rubber, the fibers being distributed uniformly throughout the resin in an unoriented condition, adding a blowing agent and subjecting the mixture to heat to foam and cure the resin.

8. A process of forming an expanded reinforced resin which comprises mixing 50 to 500 parts of phenolic-formaldehyde resin and about 70 parts of fibers of a synthetic polymer having long chain linear polycarbonamide groups separated by hydrocarbon chains with 100 parts of a butadiene-acrylonitrile copolymer rubber, the fibers being distributed uniformly throughout the resin in an unoriented condition, adding a blowing agent and subjecting the mixture to heat to foam and cure the resin.

References Cited in the file of this patent

UNITED STATES PATENTS

| Number | Name | Date |
|---|---|---|
| 2,405,038 | Jennings | July 30, 1946 |
| 2,459,739 | Groten et al. | Jan. 18, 1949 |

FOREIGN PATENTS

| Number | Country | Date |
|---|---|---|
| 582,807 | Great Britain | Nov. 28, 1946 |
| 594,579 | Great Britain | Nov. 14, 1947 |

OTHER REFERENCES

Chemical Age, July 22, 1950, page 122.
Chemical and Engineering News, Dec. 12, 1949, page 3741.